Aug. 6, 1935.  J. H. STARK  2,010,705
DEMAND METER
Filed Sept. 27, 1934
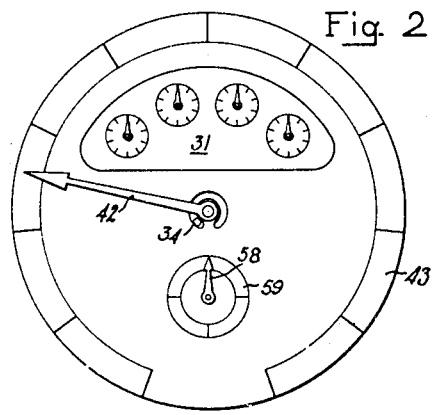
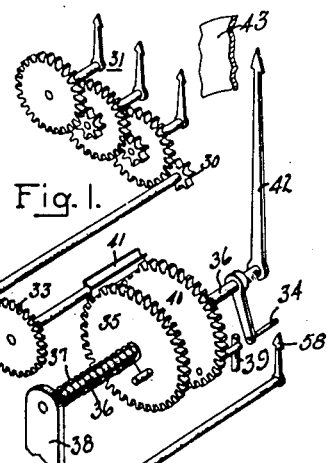
Inventor:
Julian H. Stark,
by Harry E. Dunham
His Attorney.

Patented Aug. 6, 1935

2,010,705

UNITED STATES PATENT OFFICE 2,010,705

DEMAND METER

Julian H. Stark, Fort Wayne, Ind., assignor to General Electric Company, a corporation of New York Application September 27, 1934, Serial No. 745,718

12 Claims. (Cl. 171—34)

My invention relates to maximum demand meters and has for its object improvements in this form of meter which reduce costs and increase the convenience, reliability and accuracy of this form of meter. In particular, my invention relates to an improvement in the timing interval mechanism which performs or controls the resetting operation at the end of a demand period, whereby the demand period may be easily changed and whereby the time consumed in a resetting operation is materially reduced.

The features of my invention which I believe to be novel and patentable will be pointed out in the claims appended hereto. For a better understanding of my invention, reference is made in the following description to the accompanying drawing in which Fig. 1 represents a perspective and somewhat expanded view of the operating parts of my demand meter including the circuit connections thereto, and Fig. 2 is a face view of the meter showing the preferred arrangement of the different indicating scales and pointers thereof.

Referring to Fig. 1 of the drawing, 11 represents some integrating meter the demand of which is to be indicated over a suitable demand period, such as fifteen minutes or sixty minutes, for example. The demand meter of my invention is represented as a separate device and is actuated through a system of electric impulses, the frequency of which is proportional to the rate of rotation of meter 11. A shaft 10 extends from meter 11 and operates a pair of cams 12 and 13 which are arranged in staggered relation so that their teeth alternate with each other. This system of cams and the contact members 14, 16 and 17 associated therewith are employed to send impulses to the demand meter of my invention, and in order that a clear understanding of this impulse system may be had, it will be desirable to explain this contact mechanism at the integrating meter 11.

The cams 12 and 13 are made of insulating material and the contact members are made of resilient conducting material and are supported by the insulating block 9. The double contact member 14 extends beneath both contact members 16 and 17. The free ends of contact members 16 and 17 rest on cams 12 and 13 respectively with slight tension so that as the staggered cams rotate the contact members 16 and 17 are alternately raised and lowered. Member 16 has just dropped from the high point of its cam 12 and in so doing it has contacted with member 14 slightly lowering the latter breaking contact between it and contact member 17. As the cams rotate further in a clockwise direction member 17 will drop and make contact with 14 and interrupting the contact between 16 and 14. Contact member 14 is connected to a wire 2 containing a source of supply 15 and contact members 16 and 17 are connected to wires 1 and 3 respectively. Wires 1, 2, and 3 run to the operating solenoid of my demand meter. This solenoid has two coils 18 and 19 spaced apart and axially arranged and reciprocate a plunger 22 to which there is connected a lever 24 for operating the demand gear train of my demand meter and a lever 23 comprising a portion of a toggle switch having two sets of contacts 20 and 21. Contacts 20 are connected in wire 1 between the distant integrating meter 11 and solenoid coil 18. The other set of contacts 21 is connected in the wire 3 and the circuit of coil 19 of the solenoid. The wire 2, which contains the source of supply, has a common connection to the other terminals of coils 18 and 19.

The arrangement is such that impulses are transmitted from the contact device of meter 11, first over a circuit comprising wires 1 and 2, and then over a circuit comprising wires 2 and 3 in an alternate sequence and at a rate proportional to the rotation of meter 11. These impulses are received on the coils 18 and 19 of the solenoid through the contact of the toggle switch 23 which breaks the circuit over which an impulse has just been received and completes the other circuit so that on the reception of the next alternate impulse, the other coil of the solenoid will be energized and its plunger operated in the reverse direction. At the meter 11, the circuit is shown as closed over wires 1 and 2, and the impulse which has been transmitted over this circuit has operated the plunger to the position shown and opened the circuit at contacts 20, at the same time closing the circuit of wires 2 and 3 at contacts 21. As meter 11 rotates, a connection will shortly be made at this point between wires 2 and 3 which will energize coil 19 of the solenoid and reciprocate the plunger 22 to the opposite position from that which is shown, opening the contacts at 21 and closing them at 20.

This form of impulse system has the advantage that it does not consume an unnecessary amount of electric energy because just as soon as an impulse is sent and received, the receiving device interrupts the impulse even should the meter 11 stop entirely. There is little tendency for these contacts to chatter and, even if chattering does occur, it will result in no false operation of the solenoid at the receiving end. The toggle switch operated by lever 23 provides a quick "make" and "break" of the circuit at this point. It will be understood that the toggle switch is so arranged that the circuit of a solenoid coil is not broken until the plunger has substantially completed its movement and moved the toggle beyond the dead center after which the toggle itself will complete the movement. The toggle serves also to hold the plunger of the solenoid in the position to which it was last operated and this solenoid device will, therefore, operate reliably in any angular position, that is to say, the plunger might be vertical, if so desired. Due to these features as above described, the impulse system is very reliable.

The lever 24, which is also operated by the plunger 22, operates on a ratchet wheel 25. These parts 24 and 25 may be termed an "escapement ratchet" since this mechanism combines the function of a pawl and ratchet for rotating the wheel 25, and the function of an escapement which positively limits the amount of advance of wheel 25 for each operation of the solenoid. The face of wheel 25 is provided with eight triangular-shaped teeth 28. The lever 24 is provided with an offset arc-shaped upper portion 29 which reciprocates from one periphery of wheel 25 to the other between the teeth thereon. The upper surface of portion 29 engages the slanting surface of a tooth 28 as part 29 moves to the right as viewed in Fig. 1, rotating wheel 25 one-sixteenth revolution in a counterclockwise direction. The lower surface of part 29 engages the slanting surface of a tooth as part 29 moves to the left to rotate the wheel another one-sixteenth of a revolution in the same direction. This arrangement positively drives the wheel 25 forward in steps at a rate determined by the impulse rate and at the same time it locks wheel 25 from rotation either forward or backward between the reception of impulses. This device is, therefore, not subject to over-shooting as sometimes occurs with an ordinary pawl and ratchet device and it has the additional advantage that no extra pawl is necessary to prevent backward rotation.

The shaft 26, which is advanced in accordance with the impulse rate by wheel 25, may be provided with a pinion 30 which drives an impulse totalizing register indicated at 31 where it is desired to totalize the impulses. This is possible because the shaft 26 is driven with ample torque. Shaft 26 also drives a pinion 32 which is splined on shaft 26 and always rotates therewith but is movable along the shaft into and out of driving engagement with a gear wheel 33 of the demand meter gear train. The purpose of this gear train, which includes gear 33, pinion 41, and gear 35, is to advance the demand meter dog 34 and move a friction pointer 42 up scale. The dog 34 is reset to zero, which is the position shown in the drawing, when gear 32 is moved out of mesh with gear 33 at the end of a demand interval.

The parts which are reset to zero are in general similar to previous devices of this character with the exception that the present device is provided with an arrangement to eliminate back-lash in the demand meter gear train and to exactly fix the rotative position of the teeth in gear 33 so as to mesh with pinion 32 without clashing of the gears and without rotating the gears in either direction when such engagement takes place following a resetting operation. In this arrangement, the dog 34 and gear wheel 35 are fixed to the shaft 36. A spring 37 is coiled about the shaft 36 and is fastened at one end to gear 35 and at the other end to an abutment 38. This spring is wound up when gear 33 is advanced from a zero position during a demand interval and serves to return the parts to zero position again when pinion 32 is disengaged from gear 33 at the end of such demand interval. The zero stop, shown at 39, is not directly connected with shaft 36 or the other parts secured thereto but rather this zero stop is mounted on a gear 40 which has a bearing on shaft 36. Both gears 35 and 40 mesh with pinion 41 which pinion is secured on the same shaft with gear 33. When the parts are in the zero position shown there exists an initial tension in spring 37. As a result of this arrangement, there is no back-lash between pinion 41 and gear 35 at any time, and consequently there is no error in the advance of dog 34 due to back-lash in the gear train. Furthermore, gear 33 is returned to exactly the same zero position each time so that it is a simple matter to have the teeth in pinion 32 exactly align with the depressions between the teeth in gear 33 when pinion 32 is slid into driving engagement. It was pointed out above that wheel 25 is advanced exactly one-sixteenth revolution per impulse. If, then, pinion 32 has sixteen teeth, these teeth will always assume a certain definite rotary position when shaft 26 is stationary which is most of the time since shaft 26 rotates in steps. The zero position of gear 33 is, consequently, made such as to have proper alignment of its teeth with pinion 32 when the latter is in some one of its stationary positions so that the gears are meshed without clashing and without the necessity of rotating either gear forward or backward to effect this engagement.

From the above it will be seen that the possibility of error creeping into the impulse system, in the ratchet escapement, in the demeshing arrangement, and in the demand gear train, has been reduced to a minimum. At the same time the parts are relatively few in number and simple in construction. The solenoid advancing mechanism gives high torque and the spring 36 may therefore be of sufficient tension as to quickly and positively return the dog to zero. This mechanism therefore has ample torque and may be of rugged construction and does not require delicate adjustment of the ratio of torque to friction in order to safeguard against failure.

The friction pointer 42 indicates the maximum demand on a suitable scale 43, which scale may be three hundred degrees or more in length, as shown, for example, in Fig. 2.

The timing mechanism employed to momentarily demesh the demand gear train at pinion 32 at the end of a demand interval is arranged to permit changing the length of the demand interval over a wide range in a very simple manner and without altering the short period of time during which pinion 32 is disengaged in a resetting operation.

The timing device is represented as a small self-starting synchronous motor 44 having an enclosed speed-reducing gear chamber 45. It will be assumed that the terminal shaft 46 has a speed of one revolution per minute. On shaft 46 is secured a disc 47 in which one or more laterally-extending pins are inserted near the periphery. The disc is provided with four equally-spaced holes into which these pins may be secured as by a screw and thread arrangement. The number and arrangement of pins to be used will depend upon the demand interval desired as will subsequently be explained.

The pins in disc 47 engage with slots in a disc 49 to form a Geneva drive. There are five slots in the disc 49 so that with one pin in disc 47, disc 49 will be advanced in steps at the rate of one revolution in five minutes. If there are two diametrically opposite pins in the disc 47, the Geneva disc 49 will be advanced in steps at the rate of two revolutions in five minutes. The motion of disc 49 may be considered as divided up into a series of motion impulses, each of equal magnitude, but by changing the number of pins in disc 47 these motion impulses of disc 49 occur more or less frequently. The quick advance of disc 49 during a motion impulse is always the same. A light spring 50 is provided bearing against the periphery of disc 49 to click into the slots in disc 49 in its five different stopping positions to aid in exactly positioning the slots to be engaged by the pin in disc 47 and to prevent rotary movement of disc 49 except as moved forward by the Geneva drive.

Disc 49 drives a pinion 51 and this pinion meshes with a cam gear 52. The gear ratio between 51 and 52 is assumed to have a speed reduction of twelve to one, although the invention is not limited to any particular gear ratio here. The cam gear 52 has a pin 53 extending from its side near the periphery and the end of this pin is cam shaped so as to engage and rock a lever 54 as the cam pin 53 moves past the adjacent end of this lever. The upper end of the lever is forked and engages in a slot in a collar secured to pinion 32 so that, as the lever 54 is rocked back and forth, pinion 32 is slid back and forth on shaft 26 out of and into mesh with gear 33. A light spring represented at 55 biases the lever 54 towards cam gear 52 and returns pinion 32 to the in-mesh position immediately following a demeshing operation. It will be noted that there are two additional openings 56 in cam gear 52 spaced with respect to each other and to the cam pin 53 by one hundred and twenty degrees. These openings are provided for the insertion of additional cam pins similar to cam pin 53 for certain demand intervals as will subsequently be explained.

It will now be seen that with one pin in disc 47 and one cam pin 53 in gear 52, the gear 32 will be demeshed once per hour. This is because shaft 46 rotates at one revolution per minute, the Geneva disc 49 is advanced in steps at the rate of one revolution in five minutes, and gear 52 is advanced in steps at the rate of one revolution per hour. A variety of other demand intervals may be had by adding pins to disc 47 and cam pins to gear 52 as shown by the following table:

| Pins in disc 47 | Slots in disc 49 | Gear ratio between pinions 51 and 52 | Cams in cam gear 52 | Demand interval |
|---|---|---|---|---|
| | | Reduction | | Minutes |
| 1 | 5 | 12/1 | 1 | 60 |
| 2 | 5 | 12/1 | 1 | 30 |
| 3 | 5 | 12/1 | 1 | 20 |
| 4 | 5 | 12/1 | 1 | 15 |
| 2 | 5 | 12/1 | 3 | 10 |
| 4 | 5 | 12/1 | 3 | 5 |

The engaging surfaces of cam pin 53 and lever 54 are made such that a complete demeshing and meshing operation of pinion 32 and gear 33 takes place within one of the forward motion impulses of gear 52. In all cases given, this gear 52 is stepped forward one-sixtieth part of a revolution per motion impulse, the engaging surfaces between cam pin 53 and lever 54 are dimensioned so as to completely perform their operations within one-sixtieth revolution of the cam pin and are so positioned that such resetting operation is completed within one of the forward motion impulses of the cam pin 53. I have found that a complete resetting operation may be performed in a practical and reliable manner by this mechanism in two seconds which is a sufficient length of time for the demand dog 34 to be reset to zero from any position and well within the time consumed by a single forward motion of impulse of cam pin 53.

It will be evident that this resetting operation interval of two seconds is the same regardless of the demand interval which is selected, that is to say, whether the demand interval be five minutes or one hour, it requires only two seconds to complete a resetting operation. Because this resetting period remains unchanged when the demand interval is changed, a change in the demand interval does not in any way affect the design and operating characteristics of any part of the demand meter.

It will further be noted that, in the case of a five minute demand interval and a two second resetting interval, the percentage of time of the complete demand interval during which the gear 32 is demeshed is about 0.7 per cent. In a one hour demand interval it is about .05 per cent. The probable per cent error due to the possibility of the reception of an impulse during a resetting operation is, of course, less than the percentages given above.

It may be stated that in a usual form of prior art demand meter, different demand periods were obtained by changing the gear ratio in the timing-interval train and that the time required to perform a resetting operation was proportional to the demand interval. In such prior art demand meters, the time consumed in a resetting operation expressed in per cent of the demand period, was therefore constant and moreover generally greater than 0.7 per cent which is the maximum percentage resetting time in the meter of my invention as described above.

I consider that the improvement that I have made in the timing-interval mechanism in this respect to be an important advance in the art. According to my invention, the gear ratio between the timing motor and resetting cam is changed in the sense that the demand interval may be changed but the forward-motion impulses of the timing train always remain the same and, since a resetting operation is completed during one of these impulses, the apparatus may be designed to reduce this resetting period to a minimum for all demand periods for which the meter may be used. The rotary motion of the synchronous motor driven shaft 46 may be said to be broken up by the Geneva movement into forward motion impulses of equal magnitude and time duration. For a long demand period, the interval between these motion impulses is greater than for a short demand period but in either case a resetting operation is completed during one of these equal motion impulses.

This form of timing-interval mechanism and the use of synchronous motors permit of a number of demand meters to be exactly synchronized as regards their resetting times. In Fig. 1, 57 may be taken to represent a synchronous motor of a second demand meter similar to the one represented in detail which has its resetting time synchronized with the demand meter represented by having the synchronous motors of these demand meters connected to the same source of alternating current supply and their time-interval mechanism similarly adjusted.

In many instances it is desirable that a demand meter be arranged to give an indication of the amount of time remaining in a demand interval and the meter of the present invention may be easily arranged to provide such an indication. For this purpose, I have provided the pointer 58 which is geared to shaft 46 of the synchronous motor so as to make one complete revolution during a demand period and to indicate at all times the period remaining in a demand interval on a suitable scale 59. The gear ratio between pointer 58 and shaft 46 should be changed when changing the demand interval where such an indicator 58 is used.

The face view of such a demand meter may have the appearance of Fig. 2 where 31 represents the totalizing register, 42 the demand meter friction pointer, and 43 its scale, and the pointer 58 and dial 59 the parts for indicating the time remaining in a demand interval. It will, of course, be evident that one or both of the indicating parts 31 for totalizing the impulses and the pointer 58 for indicating the portion of demand period remaining may be omitted, if desired. It will also be apparent to those skilled in the art that the improvements in the timing interval mechanism hereinbefore described may be incorporated in demand meters generally and employing other forms of resetting devices.

In accordance with the provisions of the patent statutes, I have described the principle of operation of my invention together with the apparatus which I now consider to be the best embodiment thereof, but I desire to have it understood that the apparatus shown is only illustrative and that the invention may be carried out by other means.

What I claim as new and desire to secure by Letters Patent of the United States is:

1. A demand meter comprising a demand-measuring part, means for advancing said part from a zero position in accordance with the demand to be measured, means for resetting said part to a zero position, and timing interval means for determining when said part will thus be reset comprising a timing motor, a Geneva movement driven by said motor, and means driven from said Geneva movement for controlling said resetting operation such that each such resetting operation is completed within a single motion impulse period of said Geneva movement.

2. A demand meter comprising a demand measuring part, means for advancing said part from a zero position in accordance with the demand to be measured, means for resetting said part to a zero position, and timing interval means for determining when such resetting operations will occur comprising a constant-speed timing motor, a movement for converting the constant rotary motion of said motor into intermittent rotary impulse movements of equal magnitude and duration and having means for varying the number (n) of such impulse movements which shall occur during a given period of time, and means driven from said movement for controlling the resetting operation of said demand meter such that a resetting operation will occur and be completed during each nth motion impulse of said movement.

3. In a demand meter having a demand-measuring part which is advanced from a zero position in accordance with the demand to be measured and which is periodically reset to the zero position at the end of each demand interval, a timing interval mechanism for controlling such resetting operations and the time thereof comprising a constant-speed motor, a Geneva movement driven from said motor for converting the constant rotary motion of said motor into quick intermittent rotary movements, each of equal duration and magnitude, said Geneva movement having means for varying the number (n) of the intermittent rotary movements that shall occur during a given period of time, a rotary member driven by said Geneva movement for controlling the resetting operation of said demand meter such that a resetting operation will be completed during one of the intermittent rotary movements of said Geneva movement, said rotary member having adjustable means whereby the number of resetting operations which occur during a complete revolution of said rotary member may be varied.

4. A timing interval mechanism for demand meters comprising, a constant-speed timing motor, a disc driven thereby, a pin extending from the side of said disc near its periphery, a radially slotted disc mounted for rotation adjacent the first mentioned disc, the slots therein being five in number and uniformly spaced and adapted to be periodically engaged by said pin to produce intermittent rotary movements of said slotted plate of ⅕ revolution each, a wheel, a twelve-to-one gear reduction drive between said slotted plate and wheel whereby said wheel is given sixty rotary impulses to make a complete revolution, and reset control means comprising a part rotated by said wheel and a relatively stationary part positioned to be momentarily engaged by the rotating part only during a single rotary impulse of said wheel and provisions for adding other pins to said disc and other reset control parts to said wheel at different selected points thereon to vary the number of such reset control engagements made during a given interval of time.

5. A variable demand period timing interval mechanism for maximum demand meters comprising, a rotary member having means thereon for controlling a resetting operation as said rotary member rotates through a small fraction of a revolution, a constant-speed timing motor, speed-reducing driving means connected between said timing motor and rotary member, said means also converting the constant rotary movement of said timing motor into intermittent rotary movements of said rotary member, each of equal duration and magnitude, sufficient to rotate said rotary member through an angle to complete a reset-controlling operation, and means for varying the number of such intermittent rotary movements in a given period of time.

6. A time interval mechanism for controlling the resetting operation of demand meters and the timing interval thereof comprising a constant-speed timing motor having a terminal shaft operating at one revolution per minute, a rotary reset control member, speed-reducing driving means between said motor and rotary member including a Geneva movement such that said rotary reset control member is advanced by intermittent rotary movements, each equal to 1/60 of a complete revolution thereof and each movement being completed in less than fifteen seconds, and means for adjusting the Geneva movement to vary the rate of such intermittent movements to obtain 60, 120, 180, or 240 such movements per hour.

7. A time interval mechanism for controlling the resetting operation of demand meters and the timing interval thereof comprising, a constant-speed timing motor having a terminal speed of one revolution per minute, a rotary reset control member arranged to produce at least one reset-controlling operation for each revolution thereof, driving means between said timing motor and said rotary controlling member including a Geneva movement and a twelve-to-one gear reduction whereby the constant-speed movement of said timing motor is converted into an intermittent rotary movement of said rotary reset control member requiring sixty such movements to complete a rotation thereof, means for adjusting the Geneva movement to vary the rate of such intermittent movements, and means for varying the number of reset control operations performed by said rotary member for revolution, whereby demand intervals of 5, 10, 15, 20, 30 and 60 minutes may be obtained without altering the magnitude or duration of the intermittent movements of said rotary reset control member.

8. A timing interval mechanism for demand meters for controlling the resetting operations and the demand interval of such meters, comprising a constant speed timing motor, a rotary reset-controlling member, and means between said motor and rotary controlling member for driving the latter including a mechanical device for converting the constant rotary movement of said timing motor into intermittent rotary movements at said rotary control member, and means for adjusting said mechanical device to vary the rate of such intermittent rotary movements without varying their duration or magnitude.

9. A demand meter comprising, a driving gear which is rotated in accordance with the demand to be measured, a demand-measuring member, a driving connection including a gear train between said driving gear and measuring member, an initially-tensioned spring connected to the measuring member end of said gear train so as to be further tensioned when said gear train is advanced by rotation of said driving gear, time controlled means for momentarily demeshing said drive gear from said gear train to allow said spring to return the gear train to a zero position at the end of demand-measuring intervals, means for stopping such return movement at the zero position comprising a stop gear which is blocked against backward rotation in the zero position thereof, which is not included in said driving connection but which is meshed with the driving end of the gear train, said arrangement serving to eliminate all back lash in the driving gear train which is returned to a zero position and to position the demeshed gear thereof in a definite rotary position upon its return to a zero position.

10. A demand meter including a driving gear which is intermittently advanced in equal steps in response to a measurement, a demand-measuring part including a gear driven by said driving gear, means for momentarily demeshing said gears to allow the return of the demand-measuring part to a zero position, means for returning said part to a zero position when said gears are demeshed, said driving gear having a number of teeth equal to or a multiple of the number of steps required to rotate said gear a complete revolution such that, when stationary, its teeth always assume a similar oriented position, and means for positioning said driven gear with its teeth in proper meshing alignment with the driving gear when the latter is in any one of its stationary positions upon the return of said demand-measuring part to a zero position.

11. A demand meter including a driving gear which is advanced in equal steps in response to a measurement, a demand-measuring gear train having at one end a gear driven by said driving gear, means for momentarily demeshing said driving and driven gears at the end of demand-measuring intervals, an initially-tensioned spring connected to the other end of the demand-measuring gear train which is further tensioned when said train is advanced for returning the train to a zero position when said gears are demeshed, and means for stopping the driven gear in a definite zero position upon such return movement with all of the back lash in said gear train taken up due to the initial tension of said spring, said driving gear having a number of teeth equal to or a multiple of the number of advancing steps thereof required to make a complete revolution so that, when in a stationary position between advancing steps, its teeth always assume a similar oriented position, said position being such that the driving and driven gears may be meshed without rotation of either when the latter is in its zero position.

12. A demand meter of the type which is advanced in response to electric impulses, comprising a rotary member having a plurality of evenly-spaced inwardly projecting teeth arranged in a circle about the axis of rotation of said member, a lever pivoted to reciprocate between the teeth on opposite sides of the circle into and out of engaging relation therewith, the engaging surfaces of said teeth and lever being such that said member is advanced in one direction in equal steps as said lever is reciprocated and is locked against rotation by said lever when stationary, an electromagnet responsive to electric-measuring impulses for reciprocating said lever, a demand-measuring part advanced by said rotary member having driving and driven gears arranged to be momentarily demeshed in the operation of said meter, said driving gear having a number of teeth such that it is advanced exactly the distance of one or more teeth for each step-by-step rotation of said rotary member whereby its teeth always assume a similar oriented position in all of its stationary positions.

JULIAN H. STARK.

DISCLAIMER 2,010,705.—*Julian H. Stark*, Fort Wayne, Ind. DEMAND METER. Patent dated August 6, 1935. Disclaimer filed September 28, 1935, by the assignee, *General Electric Company.*

Hereby enters the following disclaimer of claims 9, 10, and 11 of the said Letters Patent, which are in the following words, to wit:

"9. A demand meter comprising, a driving gear which is rotated in accordance with the demand to be measured, a demand-measuring member, a driving connection including a gear train between said driving gear and measuring member, an initially-tensioned spring connected to the measuring member end of said gear train so as to be further tensioned when said gear train is advanced by rotation of said driving gear, time controlled means for momentarily demeshing said drive gear from said gear train to allow said spring to return the gear train to a zero position at the end of demand-measuring intervals, means for stopping such return movement at the zero position comprising a stop gear which is blocked against backward rotation in the zero position thereof, which is not included in said driving connection but which is meshed with the driving end of the gear train, said arrangement serving to eliminate all back lash in the driving gear train which is returned to a zero position and to position the demeshed gear thereof in a definite rotary position upon its return to a zero position.

"10. A demand meter including a driving gear which is intermittently advanced in equal steps in response to a measurement, a demand-measuring part including a gear driven by said driving gear, means for momentarily demeshing said gears to allow the return of the demand-measuring part to a zero position, means for returning said part to a zero position when said gears are demeshed, said driving gear having a number of teeth equal to or a multiple of the number of steps required to rotate said gear a complete revolution such that, when stationary, its teeth always assume a similar oriented position, and means for positioning said driven gear with its teeth in proper meshing alignment with the driving gear when the latter is in any one of its stationary positions upon the return of said demand-measuring part to a zero position.

"11. A demand meter including a driving gear which is advanced in equal steps in response to a measurement, a demand-measuring gear train having at one end a gear driven by said driving gear, means for momentarily demeshing said driving and driven gears at the end of demand-measuring intervals, an initially-tensioned spring connected to the other end of the demand-measuring gear train which is further tensioned when said train is advanced for returning the train to a zero position when said gears are demeshed, and means for stopping the driven gear in a definite zero position upon such return movement with all of the back lash in said gear train taken up due to the initial tension of said spring, said driving gear having a number of teeth equal to or a multiple of the number of advancing steps thereof required to make a complete revolution so that, when in a stationary position between advancing steps, its teeth always assume a similar oriented position, said position being such that the driving and driven gears may be meshed without rotation of either when the latter is in its zero position."

[*Official Gazette October 29, 1935.*]